(12) United States Patent
Sohn et al.

(10) Patent No.: US 11,090,866 B2
(45) Date of Patent: Aug. 17, 2021

(54) APPARATUS AND METHOD FOR MANUFACTURING STEREOSCOPIC SHAPE USING LASER AND POWDER

(71) Applicant: KOREA INSTITUTE OF MACHINERY & MATERIALS, Daejeon (KR)

(72) Inventors: Hyon-kee Sohn, Daejeon (KR); Dong-sig Shin, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 477 days.

(21) Appl. No.: 15/779,436

(22) PCT Filed: Nov. 24, 2016

(86) PCT No.: PCT/KR2016/013620
§ 371 (c)(1),
(2) Date: May 25, 2018

(87) PCT Pub. No.: WO2017/091005
PCT Pub. Date: Jun. 1, 2017

(65) Prior Publication Data
US 2018/0333918 A1 Nov. 22, 2018

(30) Foreign Application Priority Data

Nov. 27, 2015 (KR) .................. 10-2015-0167079

(51) Int. Cl.
*B33Y 30/00* (2015.01)
*B23K 26/34* (2014.01)
(Continued)

(52) U.S. Cl.
CPC ........ *B29C 64/268* (2017.08); *B23K 26/0608* (2013.01); *B23K 26/0648* (2013.01);
(Continued)

(58) Field of Classification Search
CPC ................... B33Y 10/00; B33Y 30/00; B23K 26/34–342; B22F 7/02
See application file for complete search history.

(56) References Cited

U.S. PATENT DOCUMENTS

| 2004/0137731 A1* | 7/2004 | Glazer ................. B23K 26/083 438/689 |
| 2010/0006228 A1* | 1/2010 | Abe ....................... B33Y 30/00 156/356 |

(Continued)

FOREIGN PATENT DOCUMENTS

| CN | 202239628 U | 5/2012 |
| CN | 203635915 U | 6/2014 |

(Continued)

OTHER PUBLICATIONS

International Search Report for corresponding international application PCT/KR2016/013620 dated Feb. 24, 2017.

*Primary Examiner* — Michael A Laflame, Jr.
(74) *Attorney, Agent, or Firm* — Hauptman Ham, LLP (57) ABSTRACT

In a an apparatus and a method for manufacturing a stereoscopic shape using a laser and a powder, the apparatus includes a chamber, a powder supplier, a table, a cotter, a first laser head, a first stage, a second laser head and a second stage. The powder supplier provides a predetermined quantity of powder. The powder is sequentially integrated to be a plurality of powder layers in the table. The cotter moves between the powder supplier and the table, and forms the powder to be a predetermined thickness. The first laser head has a first scanner and a first F theta lens, and irradiates a first laser beam to the powder layer. The first stage transfers the first laser head. The second laser head has a second scanner and a second F theta lens, and irradiates a second laser beam. The second stage transfers the second laser head.

11 Claims, 11 Drawing Sheets

(51) Int. Cl.

| | | |
|---|---|---|
| *B22F 7/02* | (2006.01) | |
| *B29C 64/268* | (2017.01) | |
| *B23K 26/073* | (2006.01) | |
| *B23K 26/12* | (2014.01) | |
| *B23K 26/082* | (2014.01) | |
| *B23K 26/342* | (2014.01) | |
| *B29C 64/277* | (2017.01) | |
| *B29C 64/153* | (2017.01) | |
| *B29C 64/205* | (2017.01) | |
| *B23K 26/06* | (2014.01) | |
| *B33Y 50/02* | (2015.01) | |
| *B23K 103/00* | (2006.01) | |
| *B22F 10/20* | (2021.01) | |
| *B22F 10/30* | (2021.01) | |
| *B33Y 10/00* | (2015.01) | |

(52) U.S. Cl.
CPC ........ *B23K 26/0736* (2013.01); *B23K 26/082* (2015.10); *B23K 26/123* (2013.01); *B23K 26/127* (2013.01); *B23K 26/342* (2015.10); *B29C 64/153* (2017.08); *B29C 64/205* (2017.08); *B29C 64/277* (2017.08); *B22F 10/20* (2021.01); *B22F 10/30* (2021.01); *B23K 2103/00* (2018.08); *B23K 2103/42* (2018.08); *B33Y 10/00* (2014.12); *B33Y 30/00* (2014.12); *B33Y 50/02* (2014.12); *Y02P 10/25* (2015.11)

(56) References Cited

U.S. PATENT DOCUMENTS

| | | | |
|---|---|---|---|
| 2014/0263209 A1* | 9/2014 | Burris | B22F 3/105 219/121.62 |
| 2016/0311021 A1* | 10/2016 | Elfstroem | B22F 3/1055 |
| 2017/0021455 A1* | 1/2017 | Dallarosa | B29C 64/268 |
| 2017/0113303 A1* | 4/2017 | Rockstroh | B23K 26/0648 |
| 2017/0120521 A1* | 5/2017 | Sakura | B22F 3/1055 |
| 2017/0225393 A1* | 8/2017 | Shkolnik | B23K 26/0608 |
| 2018/0345378 A1* | 12/2018 | Holford | B33Y 40/00 |

FOREIGN PATENT DOCUMENTS

| | | |
|---|---|---|
| CN | 104493492 A | 4/2015 |
| JP | 63-145016 A | 6/1988 |
| KR | 10-0925363 B1 | 11/2009 |
| KR | 10-1235302 B1 | 2/2013 |

* cited by examiner

APPARATUS AND METHOD FOR MANUFACTURING STEREOSCOPIC SHAPE USING LASER AND POWDER

CROSS REFERENCE TO RELATED APPLICATION

This application claims the priority of Korean Patent Application No. 10-2015-0167079, filed on Nov. 27, 2015, in the Korean Patent Office. Further, this application is the National Phase application of International Application No. PCT/KR2016/013620 filed on Nov. 24, 2016, which is incorporated herein by reference in its entirety.

BACKGROUND

1. Field of Disclosure

The present disclosure of invention relates to an apparatus and a method for manufacturing a stereoscopic shape using a laser and a powder, and more specifically the present disclosure of invention relates to an apparatus and a method for manufacturing a stereoscopic shape using a laser and a powder, in which a laser beam is irradiated to a coated powder to form the powder to be a predetermined shape and thus a final product is formed by repeating the irradiating.

Conventionally, in a 3D printer, CAD data for a product are sliced in a direction, and a sliced 2D sectional shape is sequentially printed and integrated, so that a stereoscopic shape is manufactured.

The 3D printer is normally used to expect or correct problems of the product by manufacturing a prototype before manufacturing the product to the market, but recently, processes and materials for the 3D printer have been developed such that a durability and a dimensional accuracy of the product manufactured by the 3D printer are increased. Accordingly, the 3D printer may be more used in various kinds of manufacturing fields.

The 3D printing methods may be diversified as follows. First, a material may be selectively extruded and integrated through a nozzle or a orifice. A material ink may be dropped and integrated through an inkjet head. A liquid resin or a coated powder may be hardened or welded using ultraviolet rays or a laser beam. A liquid adhesion is selectively dispersed and integrated on a powder using an inkjet head. A laser beam or an electric beam is irradiated on a surface of a material to form a fine molten metal pool, and then a powder is injected into the fine molten metal pool to be integrated.

Here, in welding the coated powder using the laser beam, an angular velocity of the laser beam is continuously changed according to a position of the laser beam in the working field divided by a laser beam irradiation optical system, and thus a width of the welded line is changed to cause a dimensional error. Thus, a dimensional accuracy may be decreased. In addition, a focal diameter of the laser beam may be increased when the laser beam irradiation optical system is spaced apart from the powder by a predetermined distance, and thus a resolving power may be increased.

Related prior arts, Korean patent No. 10-1235302 is disclosed.

2. Description of Related Technology

The present invention is developed to solve the above-mentioned problems of the related arts. The present invention provides an apparatus and a method for manufacturing a stereoscopic shape using a laser and a powder capable of increasing a dimension accuracy and a resolving power of a product without increasing a manufacturing time, in which a laser beam is irradiated to an outer shape of a pattern shape and a fine portion of the pattern shape using a laser beam irradiation optical system uniformly maintaining an irradiation angle of the laser beam in a working field, and a laser beam is irradiated to an inside of the pattern shape using a high-speed laser beam irradiation optical system.

SUMMARY

The present invention is developed to solve the above-mentioned problems of the related arts. According to an example embodiment, an apparatus for manufacturing a stereoscopic shape using a laser and a powder supplier, comprises a chamber, a powder, a table, a cotter, a first laser head, a first stage, a second laser head and a second stage. The chamber has an inner space. The powder supplier provides a predetermined quantity of powder into the chamber. The powder is sequentially integrated to be a plurality of powder layers having a predetermined thickness and a product is welded, in the table. The cotter moves between the powder supplier and the table, and forms the powder to be a predetermined thickness. The first laser head has a first scanner and a first F theta lens, and irradiates a first laser beam to the powder layer according to an outer line of a pattern shape to be welded. The first stage transfers the first laser head along a plane direction. The second laser head has a second scanner and a second F theta lens, and irradiates a second laser beam to the powder layer according to an inner hatching line of the pattern shape to be welded. The second scanner moves the laser beam faster than the first scanner. The second F theta lens has a working field larger than the first F theta lens. The second stage transfers the second laser head.

In an example, a focal diameter of the first laser beam may be smaller than that of the second laser beam.

In an example, a power of the first laser beam may be smaller than that of the second laser beam.

In an example, a wavelength of the first laser beam may be shorter than that of the second laser beam.

In an example, the first F theta lens may include a telecentric F theta lens.

In an example, the first scanner may include a galvanometer scanner, and the second scanner may include a polygon mirror scanner.

In an example, the apparatus may further include a first laser generator generating the first laser beam toward the first laser head, and a second laser generator generating the second laser beam toward the second laser head. The first laser generator and the first scanner may be connected via an optical fiber, and the second generator and the second scanner may be connected via the optical fiber.

In an example, the table may include a supporting plate supporting the powder layer, and a lifting driver dropping the supporting plate repeatedly by a thickness of the powder layer, when the powder layer is welded to be the pattern shape.

In an example, the lifting driver may drop and rotate the supporting plate repeatedly by the thickness of the powder layer.

In an example, the chamber may include a window member disposed on the chamber and having a transparent material, the first and second laser beams passing through the window member.

In an example, the apparatus may further include a powder storage in which a remaining powder not used to be the integrated powder layer. The powder supplier, the table and the powder storage may be disposed in a line under the chamber. The cotter may move from the powder supplier to the table to form the powder layer on the table, and move from the table to the powder storage to provide the remaining powder to the powder storage.

According to the present example embodiments, a method for manufacturing a stereoscopic shape using a laser and a powder, comprises supplying a powder with a predetermined quantity, integrating the powder to be a powder layer having a predetermined thickness, irradiating a first laser beam to the powder layer according to an outer line of a pattern shape to be welded, the first laser beam being irradiated from a first laser head having a first scanner and a first F theta lens, transferring the first laser head along a plane direction, irradiating a second beam to the powder layer according to an inner hatching line of the pattern shape to be welded, the second laser beam being irradiated from a second laser head having a second F theta lens, the second scanner moving the laser beam faster than the first scanner, the second F theta lens having a working field larger than the first F theta lens, and transferring the second laser head. The supplying the powder, the integrating the powder, the irradiating the first laser beam, the transferring the first laser head, the irradiating the second beam, and the transferring the second laser head are repeated, to weld the powder to be the pattern shape.

In an example, a focal diameter of the first laser beam may be smaller than that of the second laser beam.

In an example, a power of the first laser beam may be smaller than that of the second laser beam.

In an example, a wavelength of the first laser beam may be shorter than that of the second laser beam.

In an example, the first F theta lens may include a tele centric F theta lens.

In an example, the first scanner may include a galvanometer scanner, and the second scanner may include a polygon mirror scanner.

In an example, the method may further include dropping the powder layer repeatedly by a thickness of the powder layer, when the powder layer is welded to be the pattern shape.

In an example, in the dropping the powder layer, the powder layer may be dropped and rotated repeatedly by the thickness of the powder layer.

According to the example embodiments of the present invention, an irradiation angle of the laser beam is uniformly maintained in a total area of a coated powder layer and a size of the laser beam is not changed, and thus a dimensional accuracy of a product may be increased.

In addition, a focal direction of the laser beam may be decreased, and thus a resolving power may be increased without decreasing a working field.

BRIEF DESCRIPTION OF THE DRAWINGS

FIGS. 2A to 3C are process views illustrating a method for manufacturing a stereoscopic shape using a laser and a powder according to an example embodiment of the present invention;

FIGS. 4A to 5B are schematic views illustrating focal shapes and focal sizes of laser beams a F theta lens and a tele centric F theta lens in a working field;

REFERENCE NUMERALS

| | |
|---|---|
| 100: apparatus for manufacturing a stereoscopic shape using a laser and a powder | |
| 110: chamber | 120: powder supplier |
| 130: table | 140: cotter |
| 160: first laser head | 170: second laser head |

DETAILED DESCRIPTION

Hereinafter, exemplary embodiment of the invention will be explained in detail with reference to the accompanying drawings.

Figure 1:
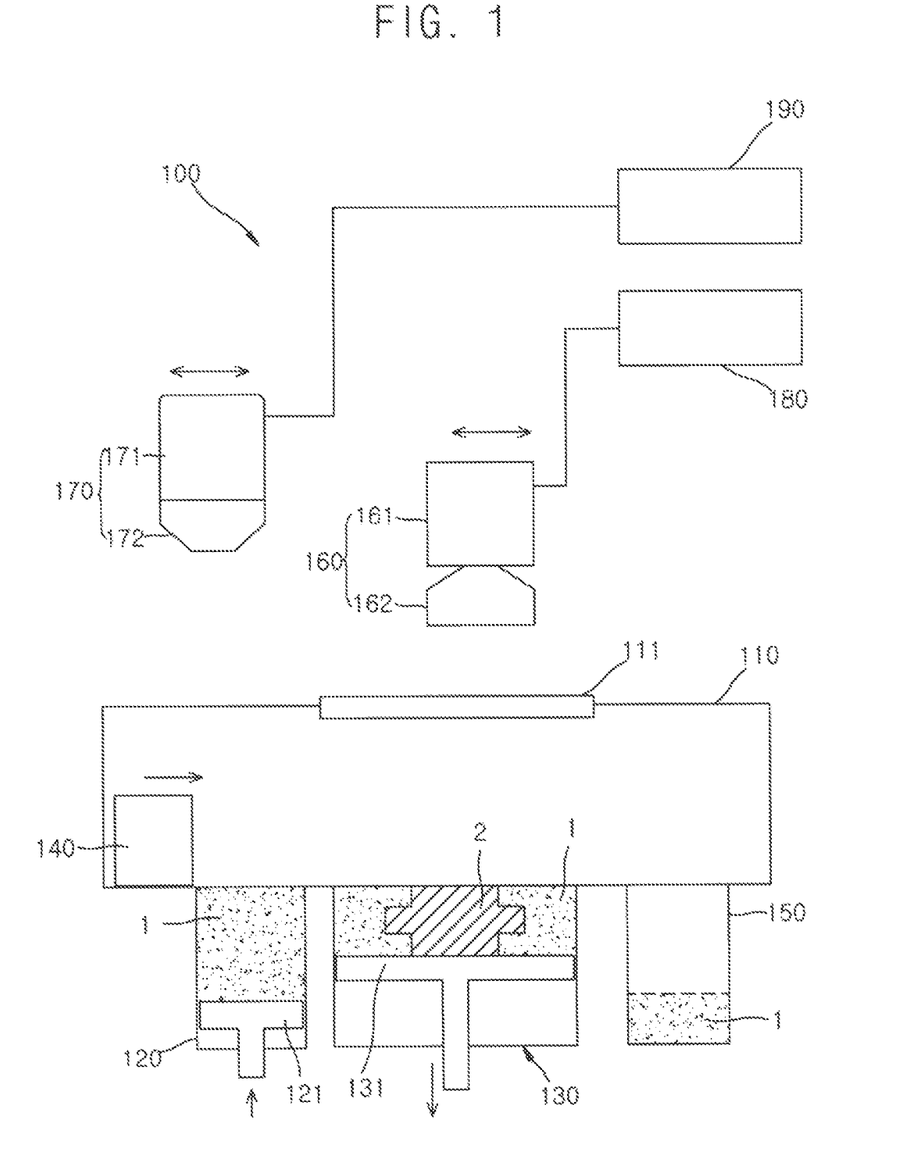
FIG. 1 is a schematic diagram illustrating an apparatus for manufacturing a stereoscopic shape using a laser and a powder according to an example embodiment of the present invention.
Figure 6A:
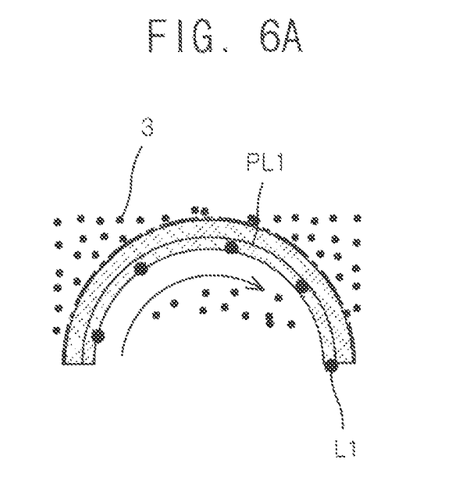
FIGS. 6A to 6C are process views illustrating the method for manufacturing the stereoscopic shape using the laser and the powder of FIGS. 3A to 3C.
Figure 6B:
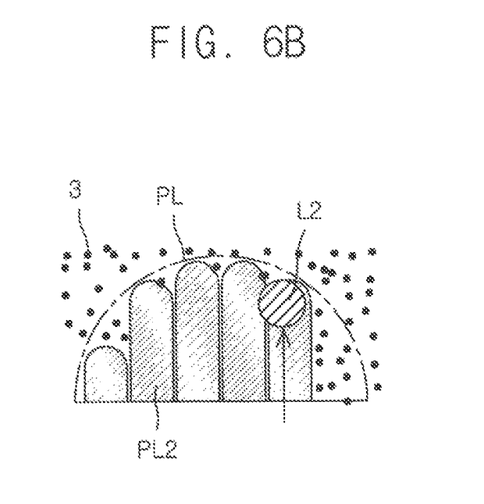
Figure 6C:
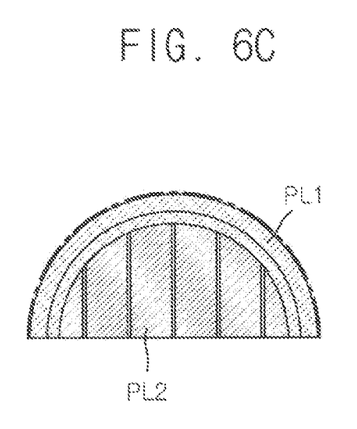
Figure 7:
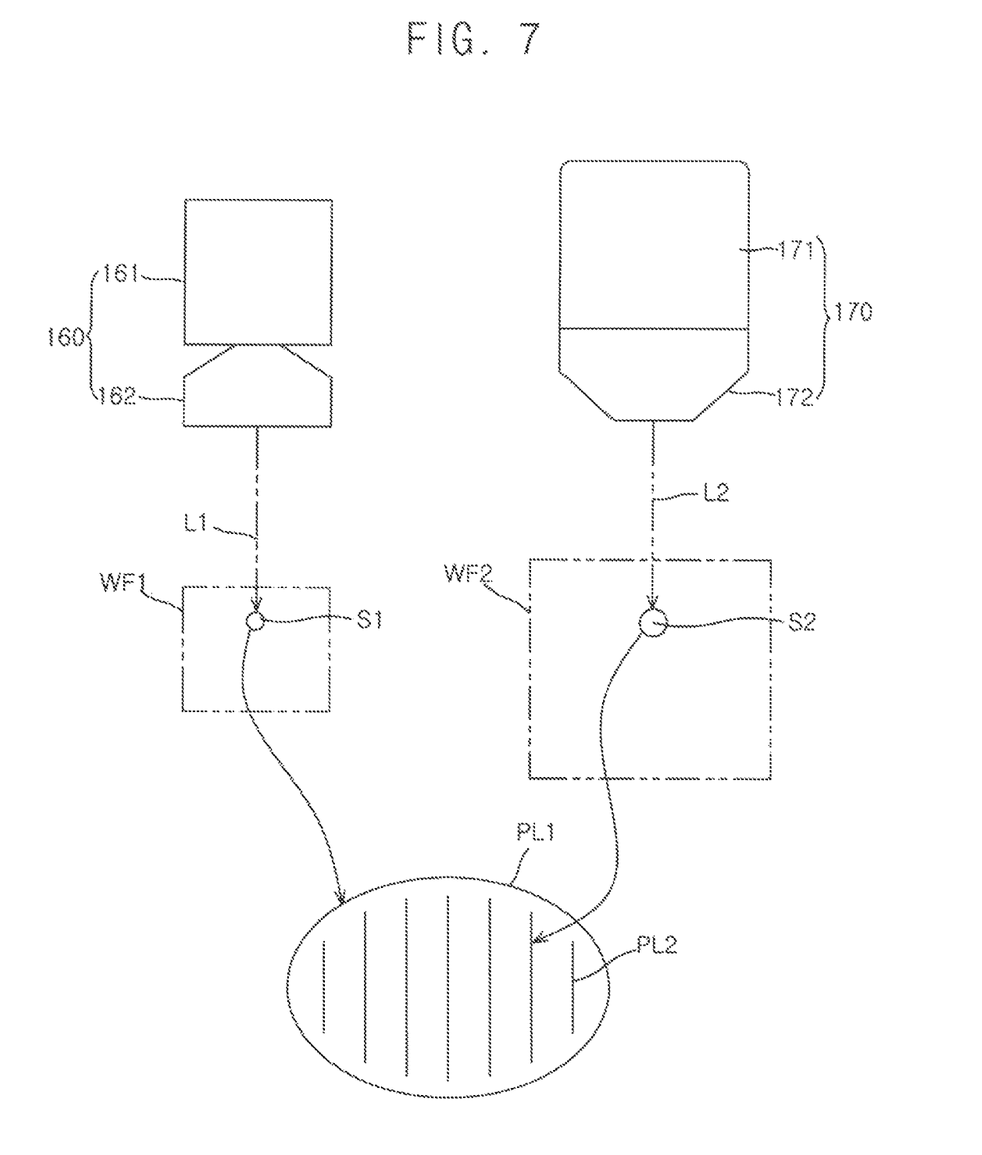
FIG. 7 is a schematic diagram illustrating functions of first and second laser heads of the apparatus of FIG. 1.
Figure 8:
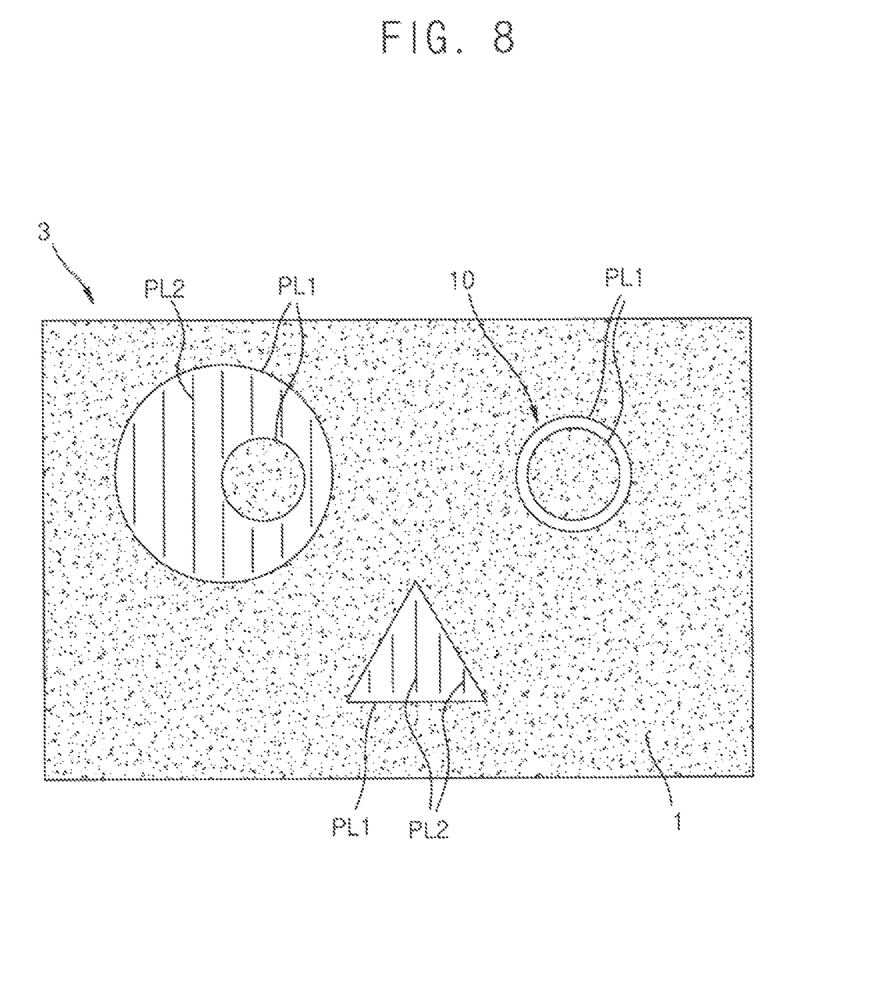
FIG. 8 is a schematic view illustrating various pattern shapes welded in a powder layer in the apparatus and the method of the present example embodiments.

FIG. 1 is a schematic diagram illustrating an apparatus for manufacturing a stereoscopic shape using a laser and a powder according to an example embodiment of the present invention. FIGS. 2A to 3C are process views illustrating a method for manufacturing a stereoscopic shape using a laser and a powder according to an example embodiment of the present invention. FIGS. 4A to 5B are schematic views illustrating focal shapes and focal sizes of laser beams a F theta lens and a tele centric F theta lens in a working field. FIGS. 6A to 6C are process views illustrating the method for manufacturing the stereoscopic shape using the laser and the powder of FIGS. 3A to 3C. FIG. 7 is a schematic diagram illustrating functions of first and second laser heads of the apparatus of FIG. 1. FIG. 8 is a schematic view illustrating various pattern shapes welded in a powder layer in the apparatus and the method of the present example embodiments.

Referring to FIGS. 1 to 8, an apparatus 100 for manufacturing a stereoscopic shape using a laser and a powder, according to the present example embodiment, irradiates a laser beam to the powder to be welded and to be formed as a predetermined pattern shape. The apparatus 100 includes a chamber 110, a powder supplier 120, a table 130, a cotter 140, a powder storage 150, a first laser head 160, a first stage (not shown), a second laser head 170, a second stage (not shown), a first laser generator (180) and a second laser generator 190.

The chamber 110 has an inner space, in which a laser beam is irradiated to a powder layer 3 and the powder 3 is welded to be a product. The inner space may be filled with an inert gas in manufacturing the pattern shape.

A window member 111 is disposed on the chamber 110. The first and second laser heads 160 and 170 are disposed over the chamber 110, and a first laser beam L1 from the first laser head 160 and a second laser beam L2 from the second laser head 170 passes through the window member 111 of the chamber 110 to reach the powder layer 3. Thus, the window member 111 may include a transparent material, such as quartz.

Although not shown in the figure, a gas exhaust (not shown) may be equipped to the chamber 110. Thus, the gas or particles generated in welding the powder layer 3 may be exhausted to outside through the gas exhaust.

The powder supplier 120 provides a predetermined quantity of powder 1 into the chamber 110, and is disposed adjacent to the table 130.

The powder 1 is stored in the power supplier 120, and the power supplier 120 includes a pusher 121 to provide the powder 1 repeatedly with a predetermined quantity. The pusher 121 lifts with a predetermined distance to push a predetermined quantity of powder 1 upwardly, so that the power 1 is provided into the chamber 110. The powder 1 provided to the chamber 110 may be provided over the table 130 via the cotter 140.

The powder 1 may include various kinds of powders, such as a metal, a polymer, and so on.

In the table 130, the powder 1 from the powder supplier 120 is sequentially integrated to be a plurality of powder layers 3 each of which has a predetermined thickness, and the product is formed by welding the powder layers. The table 130 includes a supporting plate 131 and a lifting driver (not shown).

The supporting plate 131 supports the powder layer 3 sequentially integrated. After a single powder layer 3 is integrated on the supporting plate 131, the first and second laser beams L1 and L2 are irradiated to the powder layer 3 to be welded as the pattern shape 2, and then next powder layer 3 is integrated on the welded pattern shape 2. A hot wire may be equipped in the supporting plate 131 to heat the supporting plate 131, to decrease an inner stress generated in a phase transition of the integrated powder layer 3. The supporting plate 131 may be detached from the table 130, to easily detach the pattern shape when the manufacturing is over.

The lifting driver repeatedly drops the supporting plate 131 by a thickness of the powder layer 3. After the pattern shape 2 is formed by partially welding the powder layer, the supporting plate 131 is dropped by the lifting driver by the thickness of the powder layer 3 which is to be integrated next, and then new powder layer 3 is integrated on the welded pattern shape 2. Accordingly, the supporting plate 131 is repeatedly dropped by the supporting plate 131, so that the new powder layer 3 is sequentially integrated on the pattern shape 2 which is welded from the previously integrated powder layer 3.

Here, the supporting plate 131 may be dropped and rotated by about 90°, so that the inner stress generated from the repeated welding may be decreased.

The lifting driver of the present example embodiment may be a linear transfer unit having a motor, a linear driving guide and so on, or a combination unit having the linear transfer unit and a rotating unit.

The cotter 140 forms the powder 1 from the powder supplier 120 to be the powder layer 3 having a predetermined thickness.

Figure 2A:
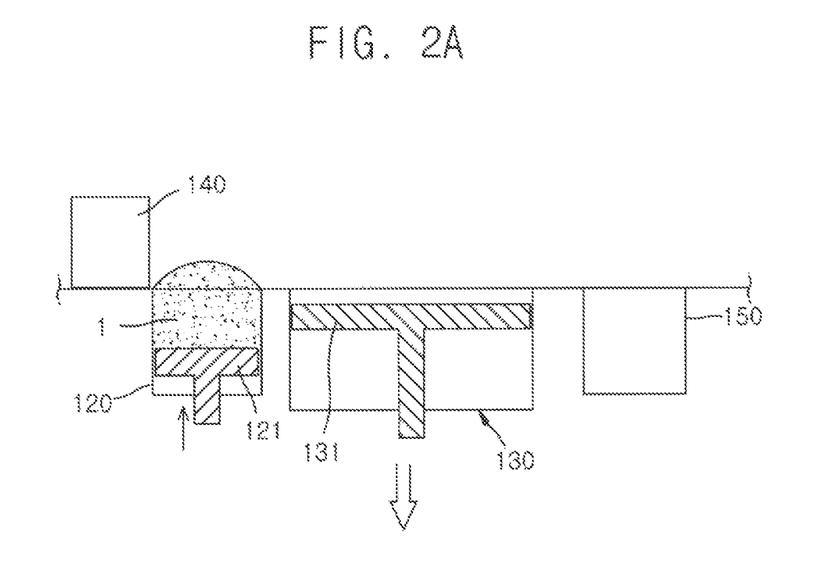
Figure 2B:
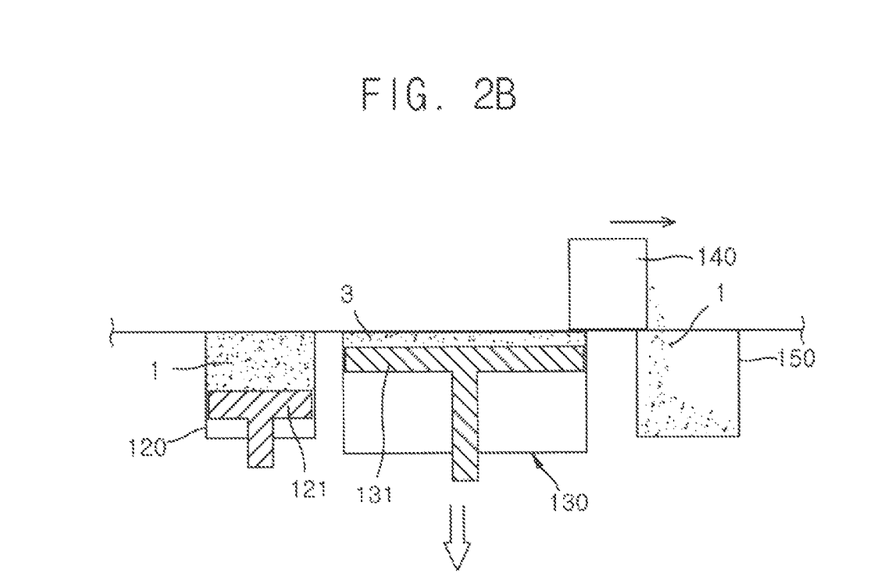
Figure 2C:
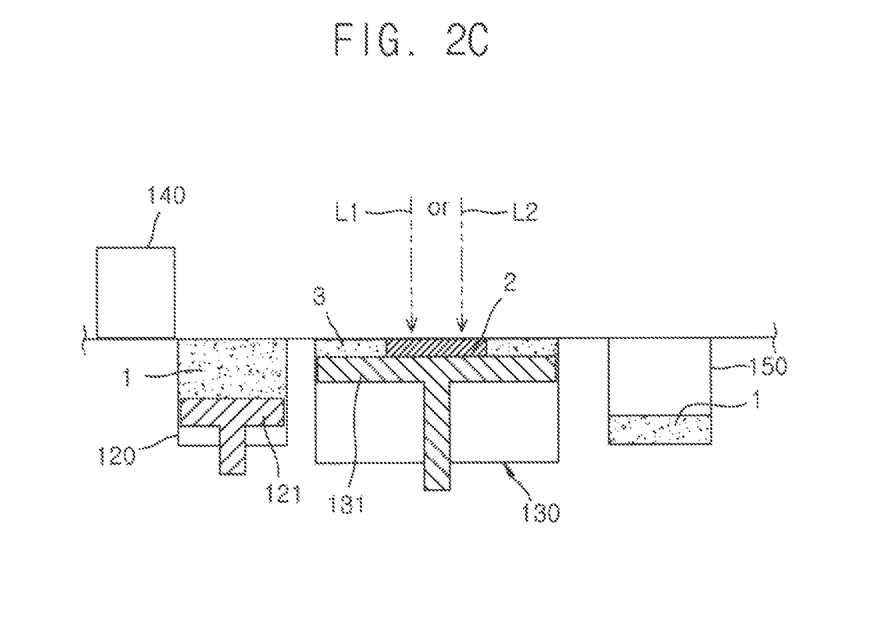
Figure 3A:
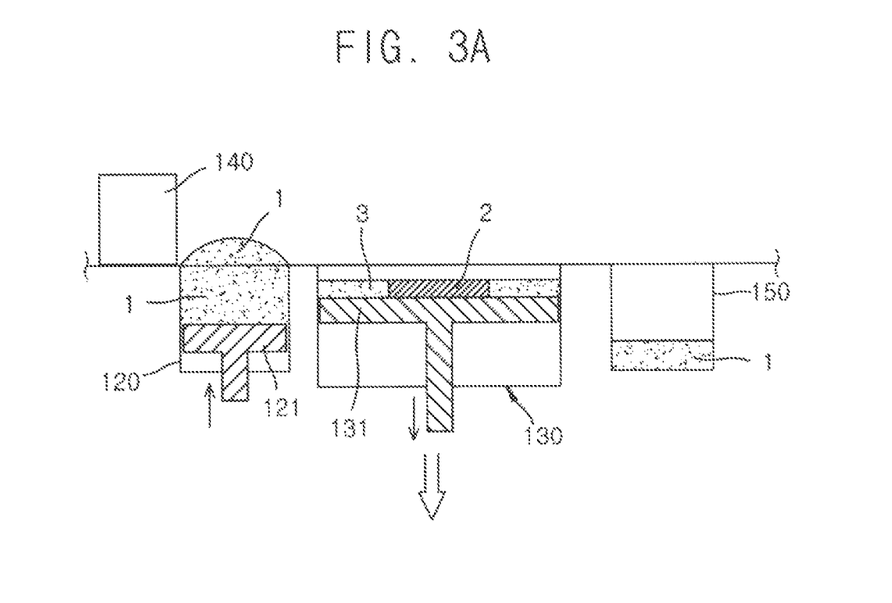
Figure 3B:
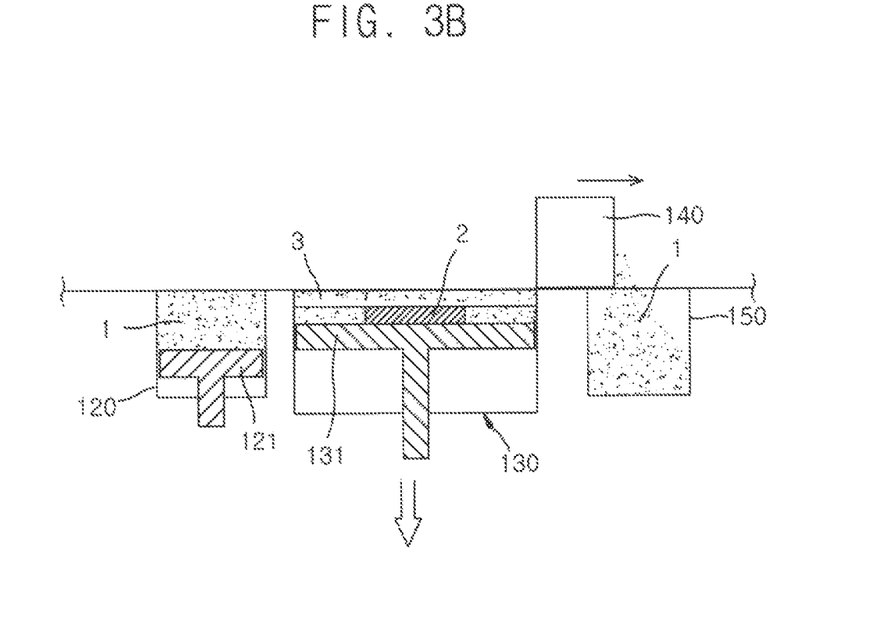
Figure 3C:
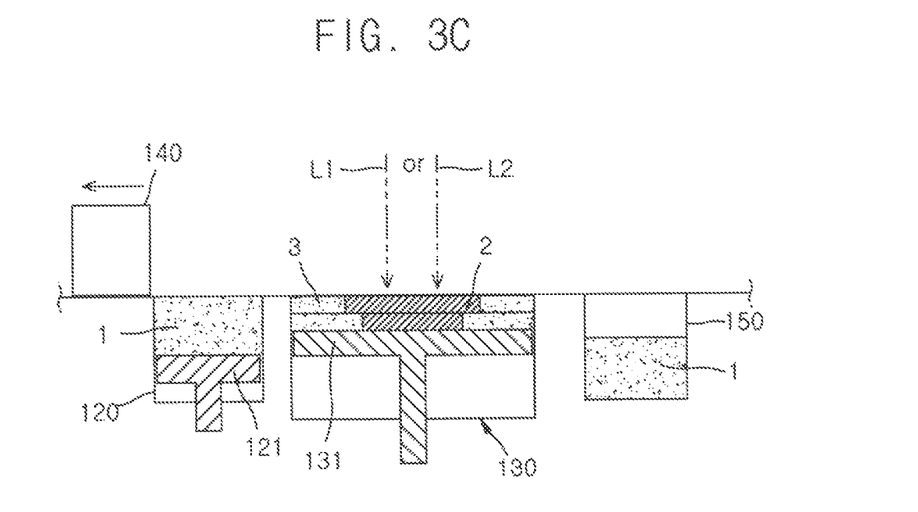

Referring to FIGS. 2 and 3, the pusher member 121 of the powder supplier 129 lifts with a constant distance, and pushes the predetermined quantity of powder 1 upwardly into the chamber 110. The cotter 140 moves from the powder supplier 120 to the table 130, and thus the powder 1 of the chamber 110 is transferred on the table 130.

Here, a lower surface of the cotter 140 tightly attaches to a bottom surface of the chamber 110, and the cotter 140 moves from the powder supplier 120 to the table 130. When the cotter 140 moves over the table 130, the powder layer 3 having a thickness substantially same as a distance between the bottom surface of the chamber 110 and the supporting plate 131, is integrated on the table 130. Here, a horizontal driver (not shown) horizontally moving the cotter 140 may be equipped to the cotter 140.

The initial powder layer 3 may be integrated on the supporting plate 131 of the table, and then the next powder layer 3 may be integrated on the previous powder layer 3 welded to the pattern shape 2.

A remaining powder 1 is stored to the powder storage 150. Here, the powder 1 provided from the powder supplier 120 may be partially unused in forming the powder layer 3, and the remaining powder 1 is defined as the unused powder of the provided powder 1. The powder 1 from the powder supplier 120 is partially integrated on the table 130 as the powder layer 3 by the cotter 140, and the remaining powder not integrated on the table 130 is more transferred by the cotter 140 to be transferred to the powder storage 150.

The powder 1 stored to the powder storage 150 moves again to the powder supplier 120 for recycling.

The first laser head 160 irradiates the first laser beam L1 to the powder layer 3 according to an outer line PL1 of the pattern shape to be welded, and includes a first scanner 161 and a first F theta lens 162.

In the present example embodiment, a galvanometer scanner may be used as the first scanner 161. The galvanometer scanner includes a reflecting mirror having a plane shape, and a motor rotating the reflecting mirror, and is normally understood by one ordinary skilled in the art and thus further explanation will be omitted.

The first F theta lens 162 has a working field WF1 smaller than that of a second F theta lens 172 mentioned below. A size of the working field of the F theta lens is proportional to a focal diameter of a laser beam and a distance between the F theta lens and a working surface, and is inversely proportional to a positional accuracy. For example, as the working field of the F theta lens is increased, the focal diameter of the laser beam passing through the F theta lens is increased, the positional accuracy is decreased, and the distance between the F theta lens and the working surface is increased, and vice versa.

Here, the outer line PL1 of the pattern shape is the final outer shape of the product and needs relatively higher dimensional accuracy, and thus the first F theta lens 162 has a relatively smaller working field WF1 to increase the positional accuracy. In addition, the focal diameter is decreased in the first F theta lens 162, and thus a resolving power is increased to form a relatively thinner portion of the product more effectively.

The F theta lens 162 may be a tele centric F theta lens having a relatively smaller working field WF1 and having a high positional accuracy of the laser beam. In the tele centric F theta lens, all light passing through the lens of the tele centric F theta lens are parallel with a light axis, and the tele centric F theta lens is normally understood by one ordinary skilled in the art and thus further explanation will be omitted.

Figure 4A:
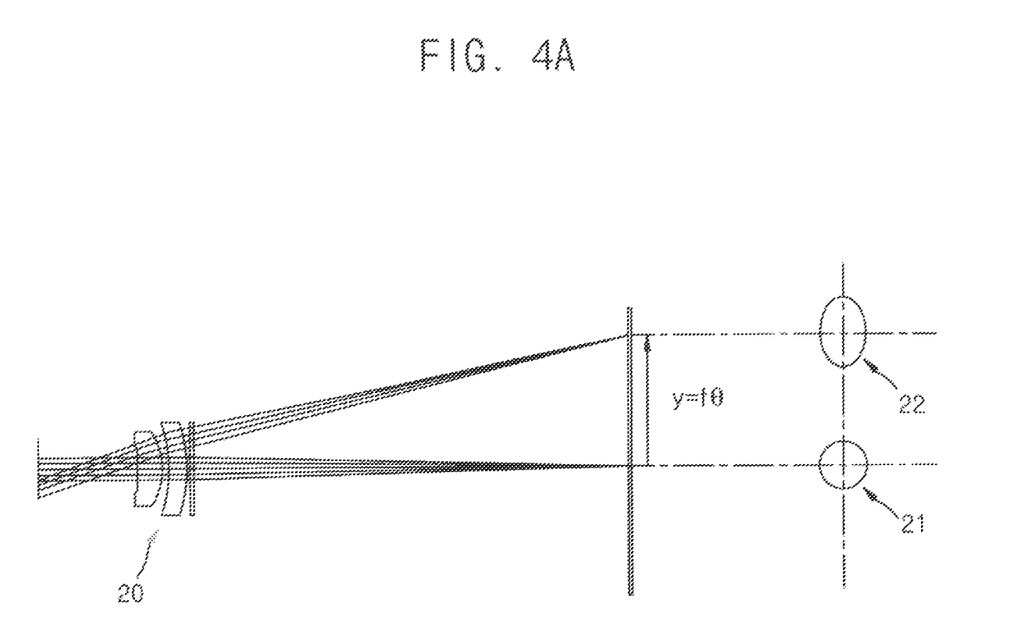
Figure 4B:
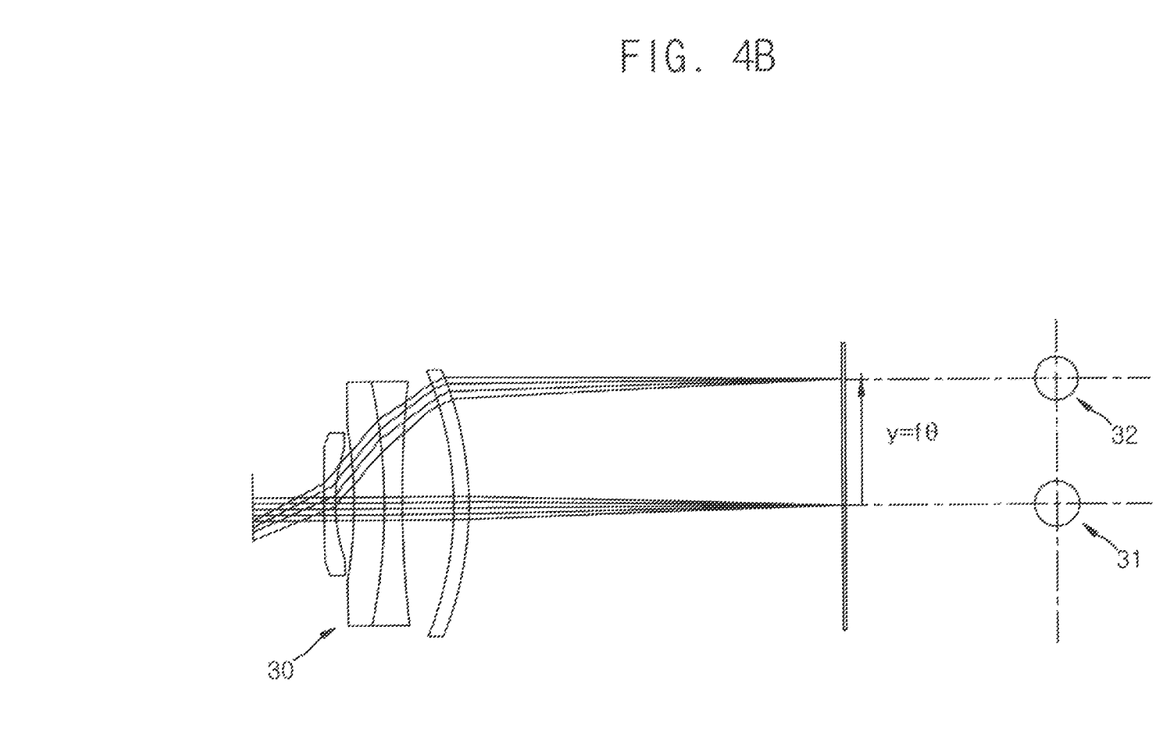
Figure 5A:
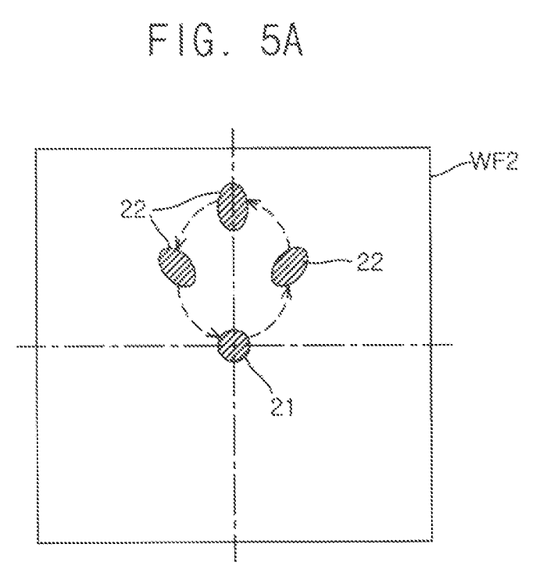
Figure 5B:
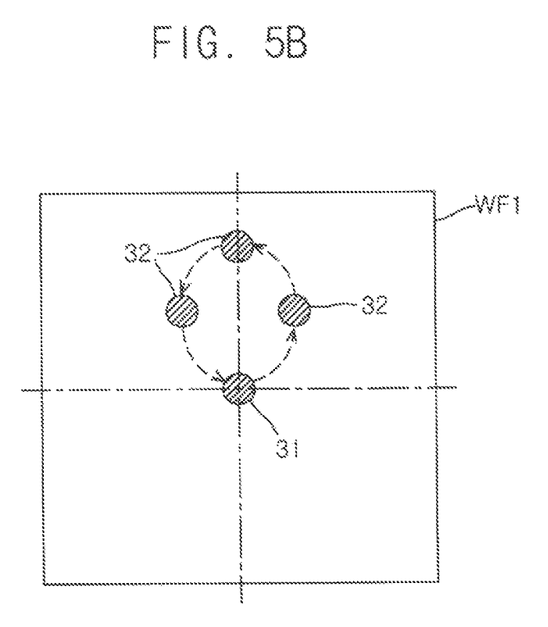

As illustrated in FIGS. 4A and 5A, in using a normal F theta lens 20, a focus 21 of the laser beam is formed as a circular shape at a central portion of the working field WF2, but a focus 22 of the laser beam is formed as an elliptical shape at a side portion of the working field WF2. Thus, a positional accuracy of the product is decreased and the surface quality of the product is also decreased, at the side portion of the working field WF2. However, as illustrated in FIGS. 4B and 5B, in using the tele centric F theta lens 30, the focus 31 and 32 of the laser beam is formed as a circular shape both at the central and side portions of the working field WF1. Thus, the positional accuracy and the surface quality of the product may be increased, both at the central and side portions of the working field WF1.

The second laser head 170 irradiates the second laser beam L2 to the powder layer 3 according to an inner hatching line PL2 of the pattern shape to be welded, and includes a second scanner 171 and a second F theta lens 172.

The second scanner 171 moves the laser beam faster than the first scanner 161. A total manufacturing distance of the inner hatching line PL2 for forming the pattern shape is relatively large, and thus the faster moving scanner is necessary. Thus, the second scanner 171 moves the laser beam faster according to the inner hatching line PL2 of the pattern shape, and thus the pattern shape may be welded much faster via passing through the inner hatching line PL2.

In the present example embodiment, a polygon mirror scanner may be used as the second scanner 171. The polygon mirror scanner includes a polygonal shape reflecting mirror, and a motor rotating the reflecting mirror. The polygon mirror scanner moves the laser beam faster than the galvanometer scanner having the plane shape.

The second F theta lens 172 has a working field WF2 larger than the first F theta lens 162. The inner hatching line PL2 of the pattern shape is an inner portion of the final product and needs relatively low dimensional accuracy. Thus, the second F theta lens 172 is sufficient for meeting the dimensional accuracy of the product with relatively low cost, and decreases total manufacturing time.

Inside of the chamber, a first stage (not shown) moving the first laser head 160 in a plane and a second stage (not shown) moving the second laser head 170 are equipped. The first stage, the second stage and the scanners 161 and 171 may be controlled such that the first stage transfers the first laser head 160 in the plane and the first laser beam L1 is irradiated to the powder layer 3, or the second stage transfers the second laser head 170 linearly and the second laser beam L2 is irradiated to the powder layer 3.

The working field of the first laser head 160 and the working field of the second laser head 170 covers total area of the powder layer 3 at once, but an area covered by the first laser head 160 and an area covered by the second laser head 170 is divided and the powder 1 is welded according to the pattern shape in the working field. Since the focal diameter of the laser beam of the second laser head 170 is larger than that of the first laser head 160, a portion not manufactured by the laser beam of the second laser head 170 should be manufactured by the laser beam of the first laser head 160, according to the pattern shape.

Here, the outer line of the pattern shape manufactured by the first laser head 160, and the portion not manufactured by the laser beam of the second laser head, are welded by controlling the first stage and the first scanner 161. Then, the second stage and the second scanner 171 are control so that the remaining portion of the pattern shape is welded by irradiating the laser beam of the second laser head 170 linearly.

The first laser generator 180 generates the first laser beam L1 to the first laser head 160, and the second laser generator 190 generates the second laser beam L2 to the second laser head 170.

In the present example embodiment, a power of the first laser beam L1 from the first laser generator 180 is smaller than that of the second laser beam L2 from the second laser generator 190. In addition, a focal diameter S1 of the first laser beam L1 from the first laser head 160 is smaller than a focal diameter S2 of the second laser beam L2 from the second laser head 170.

The outer line PL1 of the pattern shape affects the dimensional accuracy and the surface roughness of the product, and thus the focal diameter of the first laser beam L1 is to be relatively small and the power of the first laser beam L1 is to be relatively low.

For the inner hatching line PL2 of the pattern shape, the focal diameter S2 of the second laser beam is enlarged enough to increase a covering area in one manufacturing process. In addition, the second laser beam L2 is relatively faster and the focal diameter S2 of the second laser beam is relatively larger, and the power of the second laser beam L2 is increased for the irradiating using the second laser generator 190 having a relatively high power, and thus the manufacturing time may be decreased.

For example, the power of the first laser generator 180 may be about 400 W, and the power of the second laser generator 190 may be about 1 kW. In addition, the focal diameter S1 of the first laser beam may be between about 10 μm and about 40 μm, and the focal diameter S2 of the second laser beam may be between about 300 μm and about 500 μm.

A wavelength of the first laser beam L1 from the first laser head 160 is shorter than that of the second laser beam L2 from the second laser head 170. For example, the first laser generator 180 may generate a green light laser beam (wavelength is about 532 nm), and the second laser generator 190 may generate an infrared light laser beam (wavelength is about 1,064 nm). Here, the first laser generator 180 generates the green light laser beam, and the focal diameter is decreased as the wavelength is decreased, so that the dimensional accuracy and the resolving power may be enhanced.

In addition, the first laser generator 180 and the first scanner 161 are connected via an optical fiber, and the second laser generator 190 and the second scanner 171 are connected via the optical fiber.

Hereinafter, the method for manufacturing a stereoscopic shape using a laser and a powder will be explained referring to FIG. 2 to FIG. 6C.

First, a predetermined quantity of powder 1 is provided.

The powder supplier 120, the table 130 and the powder storage 150 are arranged in a line under the chamber 110. The pusher member 121 of the powder supplier 120 is lifted by a predetermined distance, to push the predetermined quantity of powder 1 upwardly to be provided to the chamber 110 (referring to FIG. 2A).

Then, the powder 1 is integrated to be the powder layer 3 having a predetermined thickness.

The cotter 140 moves from the powder supplier 120 to the table 130, and then the powder 1 in the chamber 110 is transferred on the table 130. Then, the powder layer 3 having a thickness substantially same as the distance between the bottom surface of the chamber 110 and the supporting plater 131 is integrated on the table 130 (referring to FIG. 2B). Here, the cotter 140 continuously moves from the table 130 to the powder storage 150, to provide the powder 1 not used in the powder layer 3 to the powder storage 150.

Then, the first laser beam L1 is irradiated to the powder layer 3 according to the outer line PL1 of the pattern shape to be welded. The outer line PL1 of the pattern shape is the final outer shape of the product and thus the dimensional accuracy and the resolving power should be enhanced, so that the first F theta lens 162 is used for performing the higher dimensional accuracy and the smaller focal diameter with having relatively smaller working field WF1 (referring to FIG. 2C).

Then, the first head 160 is transferred along the plane direction. Since the working area of the first laser head 160 is hard to cover the total area of the powder layer 3 at once, the powder layer 3 is divided into a plural based on a size of the working field and then the first laser head 160 is transferred in the plane for welding the powder layer 3.

Then, the second laser beam L2 is irradiated to the powder layer 3 according to the inner hatching line PL2 of the pattern shape. Total manufacturing distance of the inner hatching line LP2 is relatively longer, and thus the second scanner 171 includes the scanner moving the laser beam relatively faster. The inner hatching line PL2 of the pattern shape is the inside of the pattern shape and needs relatively lower dimensional accuracy. Thus, the second F theta lens 172 may be a normal F theta lens capable of performing a relatively lower dimensional accuracy but decreasing the manufacturing time due to an increased working field, and thus the cost may be decreased (referring to FIG. 2C).

Then, the second laser head 170 is transferred. Since the working area of the second head 170 is not enough to cover the total area of the powder layer 3, the laser head 170 linearly moves to weld the powder layer 3.

As illustrated in FIGS. 6A to 6C, in the present example embodiment, the outer line PL1 of the pattern shape is firstly welded by the first laser beam, and then the inner hatching line PL2 of the pattern shape is welded by the second laser beam, to complete the welding of the pattern shape.

Then, the lifting driver drops the supporting plater 131 by the thickness of the powder layer 3, after the powder layer 3 is welded to be the pattern shape via the first laser beam L1 and the second laser beam L2 (FIG. 3A). Here, the supporting plater 131 may rotates about 90°.

Then, the pusher member 121 of the powder supplier 120 is lifted by a predetermined distance to push the predetermined quantity of powder 1 upwardly to provide the powder 1 into the chamber 110, and the cotter 140 moves from the powder supplier 120 to the table 130 to integrate the new powder layer 3 on the welded powder layer 3 (referring to FIG. 3B). When the new powder layer 3 is integrated, the first and second laser beams L1 and L2 are sequentially irradiated to the powder layer 3 to form the pattern shape 2 via partially welding the powder layer 3 (referring to FIG. 3C).

Accordingly, the above-mentioned processes are repeated, to form the pattern shape using each of the powder layers 3, and thus each pattern shape is integrated to form a stereoscopic product.

Finally, the outer line PL1 of the pattern shape 2 is the outer shape of the final product and needs relatively higher dimensional accuracy and the higher resolving power, and the inner hatching line PL2 of the pattern shape 2 is the inner shape of the final product and needs relatively lower dimensional accuracy.

Thus, in the present example embodiment, the pair of laser heads having the laser beam moving speed different from each other and dimensional accuracy different from each other are used to weld the outer line PL1 of the pattern shape and the inner hatching line PL2 differently and dividedly for the forming of the pattern shape.

Referring to FIG. 8, when the distance between the inner hatching line and the outer line of the pattern shape 10 is too small so that the inner hatching line is hard to be manufactured by the second laser beam L2 having a relatively larger focal diameter S2, the first laser beam L1 having a relatively smaller focal diameter S1 may be used for the manufacturing the inner hatching line.

According to the example embodiments of the present invention, an irradiating angle of the laser beam is maintained uniformly in the total area of the powder layer and the size of the laser beam is maintained uniformly, and thus the dimensional accuracy of the product may be enhanced.

In addition, the focal diameter of the laser beam is to be decreased, and thus the resolving power may be increased without decreasing the working field.

In addition, an additional powder storage is equipped, and thus the powder not used for the powder layer may be recycled.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An apparatus for manufacturing a stereoscopic shape using a laser and a powder, the apparatus comprising:
a chamber having an inner space;
a powder supplier configured to provide a predetermined quantity of powder into the chamber;
a table in which the powder is sequentially integrated to be a plurality of powder layers having a predetermined thickness and a product is welded;
a cotter configured to move between the powder supplier and the table, and configured to form the powder to be a predetermined thickness;
a first laser head having a first scanner and a first F theta lens, and configured to irradiate a first laser beam to the powder layer according to an outer line of a pattern shape to be welded;
a first stage configured to transfer the first laser head along a plane direction;
a second laser head having a second scanner and a second F theta lens, and configured to irradiate a second laser beam to the powder layer according to an inner hatching line of the pattern shape to be welded, the second scanner configured to move the laser beam faster than the first scanner, the second F theta lens having a working field larger than the first F theta lens; and
a second stage configured to transfer the second laser head.

2. The apparatus of claim 1, wherein a focal diameter of the first laser beam is smaller than that of the second laser beam.

3. The apparatus of claim 2, wherein a power of the first laser beam is smaller than that of the second laser beam.

4. The apparatus of claim 1, wherein a wavelength of the first laser beam is shorter than that of the second laser beam.

5. The apparatus of claim 1, wherein the first F theta lens comprises a tele centric F theta lens.

6. The apparatus of claim 1, wherein the first scanner comprises a galvanometer scanner, and the second scanner comprises a polygon mirror scanner.

7. The apparatus of claim 1, further comprising:
a first laser generator configured to generate the first laser beam toward the first laser head; and
a second laser generator configured to generate the second laser beam toward the second laser head,
wherein the first laser generator and the first scanner are connected via an optical fiber, and the second generator and the second scanner are connected via the optical fiber.

8. The apparatus of claim 1, wherein the table comprises:
a supporting plate configured to support the powder layer; and a lifting driver configured to drop the supporting plate repeatedly by a thickness of the powder layer, when the powder layer is welded to be the pattern shape.

9. The apparatus of claim 8, wherein the lifting driver is configured to drop and rotate the supporting plate by the thickness of the powder layer.

10. The apparatus of claim 1, wherein the chamber comprises a window member disposed on the chamber and having a transparent material, the first and second laser beams passing through the window member.

11. The apparatus of claim 1, further comprising a powder storage in which a remaining powder not used to be the integrated powder layer, wherein the powder supplier, the table and the powder storage are disposed in a line under the chamber, wherein the cotter moves from the powder supplier to the table to form the powder layer on the table, and moves from the table to the powder storage to provide the remaining powder to the powder storage.

\* \* \* \* \*